US011521535B2

(12) United States Patent
Lee et al.

(10) Patent No.: US 11,521,535 B2
(45) Date of Patent: Dec. 6, 2022

(54) DISPLAY DEVICE AND DRIVING METHOD THEREFOR

(71) Applicant: SAMSUNG ELECTRONICS CO., LTD., Suwon-si (KR)

(72) Inventors: Jae-hyang Lee, Suwon-si (KR); Ho-seop Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 531 days.

(21) Appl. No.: 16/325,117

(22) PCT Filed: Mar. 8, 2017

(86) PCT No.: PCT/KR2017/002490
§ 371 (c)(1),
(2) Date: Feb. 12, 2019

(87) PCT Pub. No.: WO2018/038338
PCT Pub. Date: Mar. 1, 2018

(65) Prior Publication Data
US 2021/0295760 A1    Sep. 23, 2021

(30) Foreign Application Priority Data
Aug. 26, 2016 (KR) .................. 10-2016-0109484

(51) Int. Cl.
*G09G 3/20* (2006.01)
*G09G 3/32* (2016.01)
*G06F 3/14* (2006.01)

(52) U.S. Cl.
CPC ......... *G09G 3/2003* (2013.01); *G06F 3/1446* (2013.01); *G09G 3/32* (2013.01);
(Continued)

(58) Field of Classification Search
CPC .. G09G 3/2003; G09G 3/32; G09G 2310/027; G09G 2330/023;
(Continued)

(56) References Cited

U.S. PATENT DOCUMENTS 6,593,902 B1  7/2003  Ogino et al.
6,791,513 B2 * 9/2004  Ogino .................. G06F 3/1446
                                                      345/55
(Continued)

FOREIGN PATENT DOCUMENTS

EP    2 515 291 A1   10/2012
JP    10-333631 A    12/1998
(Continued)

OTHER PUBLICATIONS

Communication dated Jun. 4, 2019, issued by the European Patent Office in counterpart European Application No. 17843758.8.
(Continued)

*Primary Examiner* — Michael J Jansen, II
(74) *Attorney, Agent, or Firm* — Sughrue Mion, PLLC

(57) ABSTRACT

A display device is disclosed. The display device comprises: a display including a plurality of display modules; a display driving unit including a plurality of driving modules connected to each of the plurality of display modules; a storage for storing current control information according to the luminance of a display device; and a processor for calculating the maximum power amount available in each of the plurality of display modules on the basis of the entire power capacity, which can be provided by the plurality of driving modules, and of the individual power consumption amount of each of the plurality of display modules, calculating a peak luminance level of each of the plurality of display modules on the basis of the calculated maximum power amount, and controlling, on the basis of the current control
(Continued)

information, the plurality of driving modules such that each of the plurality of display modules has the corresponding peak luminance level.

13 Claims, 14 Drawing Sheets

(52) U.S. Cl.
CPC ............... *G09G 2300/026* (2013.01); *G09G 2300/0452* (2013.01); *G09G 2310/027* (2013.01); *G09G 2310/0272* (2013.01); *G09G 2320/0233* (2013.01); *G09G 2320/0693* (2013.01); *G09G 2330/023* (2013.01)

(58) Field of Classification Search
CPC ... G09G 2300/0452; G09G 2320/0693; G09G 2310/0272; G09G 2320/0233; G09G 2300/026; G09G 2320/062; G06F 3/1446
See application file for complete search history.

(56) References Cited

U.S. PATENT DOCUMENTS

| | | | | |
|---|---|---|---|---|
| 7,502,950 B1* | 3/2009 | Brands | G06F 3/1446 | 323/234 |
| 8,063,871 B2* | 11/2011 | Lee | G09G 3/3406 | 345/212 |
| 8,294,387 B2* | 10/2012 | Hamada | H05B 31/50 | 315/297 |
| 8,433,881 B2* | 4/2013 | Gruijters | G06F 9/30032 | 711/214 |
| 8,441,504 B2* | 5/2013 | Sakanoue | G09G 3/3406 | 345/690 |
| 8,797,368 B2* | 8/2014 | Yoo | G09G 5/10 | 345/690 |
| 8,902,127 B2* | 12/2014 | Li | G09F 9/33 | 345/1.3 |
| 8,963,800 B2* | 2/2015 | Murai | G09G 3/3406 | 345/1.1 |
| 9,159,272 B2* | 10/2015 | Murai | G09G 3/3413 |
| 9,286,020 B2* | 3/2016 | Dunn | G06F 3/14 |
| 9,711,093 B2* | 7/2017 | Fujiwara | G09G 3/3426 |
| 9,952,475 B2* | 4/2018 | Kim | G02F 1/13624 |
| 10,431,138 B2* | 10/2019 | Cho | G09G 3/3666 |
| 10,553,146 B2* | 2/2020 | Pyo | G09G 3/2077 |
| 10,699,674 B2* | 6/2020 | Jeong | G06T 5/009 |
| 10,713,994 B2* | 7/2020 | Cho | G09G 3/2003 |
| 11,029,912 B2* | 6/2021 | Park | G09G 3/32 |
| 11,049,440 B2* | 6/2021 | Joo | G09G 3/32 |
| 2003/0146882 A1* | 8/2003 | Ogino | G09G 3/2092 | 345/1.1 |
| 2008/0186393 A1* | 8/2008 | Lee | G09G 3/3406 | 348/301 |
| 2009/0310022 A1* | 12/2009 | Sakanoue | G09G 3/3611 | 348/571 |
| 2009/0312884 A1* | 12/2009 | Li | G09F 9/33 | 700/295 |
| 2010/0026722 A1* | 2/2010 | Kondo | H04N 21/440281 | 345/660 |
| 2010/0177086 A1* | 7/2010 | Nakamura | G09G 3/3258 | 345/211 |
| 2010/0194292 A1* | 8/2010 | Hamada | H05B 45/22 | 315/158 |
| 2011/0216097 A1* | 9/2011 | Yoo | G09G 5/10 | 345/690 |
| 2012/0120310 A1* | 5/2012 | Gruijters | G06F 9/30029 | 348/441 |
| 2012/0299891 A1* | 11/2012 | Fujiwara | G09G 3/3426 | 345/212 |
| 2012/0299979 A1* | 11/2012 | Murai | H05B 45/28 | 345/690 |
| 2013/0027370 A1* | 1/2013 | Dunn | G06F 3/14 | 345/207 |
| 2013/0314458 A1* | 11/2013 | Murai | G09G 3/3406 | 345/691 |
| 2014/0340437 A1* | 11/2014 | Kohashikawa | G09G 3/3426 | 345/694 |
| 2015/0194123 A1* | 7/2015 | Lee | G02B 3/0037 | 345/1.3 |
| 2016/0342005 A1* | 11/2016 | Kim | G02F 1/1368 |
| 2017/0294156 A1* | 10/2017 | Pyo | G09G 3/2003 |
| 2018/0061298 A1* | 3/2018 | Cho | G06F 3/1446 |
| 2019/0206364 A1* | 7/2019 | Jeong | G09G 3/2096 |
| 2019/0392750 A1* | 12/2019 | Cho | G06F 3/1446 |
| 2020/0126476 A1* | 4/2020 | Joo | G06F 3/1446 |
| 2021/0295760 A1* | 9/2021 | Lee | G09G 3/32 |

FOREIGN PATENT DOCUMENTS

| | | |
|---|---|---|
| JP | 2006-311270 A | 11/2006 |
| JP | 2007-298778 A | 11/2007 |
| JP | 2009-300968 A | 12/2009 |
| JP | 2010-164619 A | 7/2010 |
| JP | 2010-527043 A | 8/2010 |
| KR | 20-0165549 Y1 | 1/2000 |
| KR | 10-2006-0084206 A | 7/2006 |
| KR | 10-0698154 B1 | 3/2007 |
| KR | 10-2010-0021459 A1 | 2/2010 |
| KR | 10-2012-0120310 A | 11/2012 |
| KR | 10-2015-0142132 A | 12/2015 |
| WO | 2008142602 A2 | 11/2008 |
| WO | 2011104952 A1 | 9/2011 |
| WO | 2012108337 A1 | 8/2012 |

OTHER PUBLICATIONS

Communication dated Jan. 28, 2020, issued by the Japanese Patent Office in counterpart Japanese Application No. 2019-504028.
Communication dated Jul. 21, 2020 issued by the Japanese Patent Office in Japanese Patent Application No. 2019-504028.
Communication dated Aug. 24, 2020 issued by the Korean Intellectual Property Office in Korean Patent Application No. 10-2016-0109484.
International Search Report dated Jun. 21, 2017, issued by the International Searching Authority in International Application No. PCT/KR2017/002490 (PCT/ISA/210).
Written Opinion dated Jun. 21, 2017, issued by the International Searching Authority in International Application No. PCT/KR2017/002490 (PCT/ISA/237).
Communication dated Apr. 8, 2021, issued by Intellectual Property India in Indian Application No. 201947005807.
Communication dated Apr. 30, 2021, issued by the National Intellectual Property Administration of P.R. China in Chinese Application No. 201780052418.9.
Communication dated Jul. 15, 2021 by the European Patent Office in European Application No. 17843758.8.

* cited by examiner

DISPLAY DEVICE AND DRIVING METHOD THEREFOR

TECHNICAL FIELD

The present disclosure relates to a display device and a driving method therefor, and more particularly, to a display device including a display constituted by self light emitting elements driven by a current, and a driving method therefor.

BACKGROUND ART

A light emitting diode (LED) is a semiconductor light emitting element that converts a current into light. As luminance of the light emitting diode is recently increased, the light emitting diode has been increasingly used as a light source for display, a light source for vehicle, and a light source for illumination, and a light emitting diode that emits white light having excellent efficiency may be implemented by using a fluorescent material or combining light emitting diodes of various colors.

Such a light emitting diode may display an image with high luminance as the current increases.

In particular, when a display constituted by a plurality of LED display modules (for example, LED cabinets) is used, peak luminance of each display module is determined based on rated power capacity that may be provided by each of the display modules.

In this case, however, there is a problem that power provided by a display device may not be maximally used because the amount of power required to implement peak luminance differs according to the image displayed on each display module.

DISCLOSURE

Technical Problem

An object of the present disclosure is to provide a display device capable of maximizing a peaking effect through power sharing among a plurality of display modules at the time of implementing peak luminance, and a driving method therefor.

Technical Solution

According to an aspect of the present disclosure, a display device includes: a display configured to include a plurality of display modules; a display driver configured to include a plurality of driving modules connected to the plurality of display modules, respectively; a storage configured to store current control information for each luminance of a display element; and a processor configured to calculate the maximum power amount usable in each of the plurality of display modules based on a total power capacity that is provided by the plurality of driving modules and an individual consumed power amount of each of the plurality of display modules, to calculate a peak luminance level of each of the plurality of display modules based on the calculated maximum power amount, and to control the plurality of driving modules so that each of the plurality of display modules has a corresponding peak luminance level based on the current control information.

The total power capacity may be calculated by a sum of rated power capacities that are provided by the plurality of driving modules, respectively.

The processor may calculate the maximum power amount usable in each of the plurality of display modules based on the total power capacity that is provided by the plurality of driving modules, and a ratio between a total consumed power amount of the plurality of display modules and the individual consumed power amount of each of the plurality of display modules.

The current control information may include current control information for each luminance of each sub-pixel calibrated based on luminance and color characteristics according to a current of each of the sub-pixels constituting the plurality of display modules, and the processor may control the plurality of driving modules so that each of the plurality of display modules has the corresponding peak luminance level based on the information stored in the storage.

The current control information stored in the storage may include the current gain value for each luminance of each sub-pixel calibrated based on luminance level information according to the current of each sub-pixel and color shift information according to the current of each sub-pixel.

The storage may further store luminance level information for each power provided to the display module, and the processor may calculate the peak luminance level of each of the plurality of display modules based on the maximum luminance level information for each power and the maximum power amount usable in each of the plurality of display modules.

The processor may obtain the current gain value for each sub-pixel corresponding to each of the plurality of display modules so that each of the plurality of display modules has the calculated peak luminance level from the storage, and control a driving state of each of the plurality of driving modules based on the obtained current gain value for each sub-pixel.

The storage may further store power information of each of the sub-pixels for each grayscale of an image, and the processor may calculate a consumed power amount of each of the plurality of display modules based on a grayscale of the image displayed on each of the plurality of display modules, and the power information of each of the sub-pixels for each grayscale.

Each of the plurality of display modules may be implemented as a light emitting diode (LED) cabinet including a plurality of LED elements, and each sub-pixel may be a Red (R) LED, Green (G) LED, and Blue (B) LED pixel.

According to another aspect of the present disclosure, a driving method of a display device including a display constituted by a plurality of display modules includes: calculating the maximum power amount usable in each of the plurality of display modules based on a total power capacity that is provided by a plurality of driving modules driving the plurality of display modules, and an individual consumed power amount of each of the plurality of display modules; and calculating a peak luminance level of each of the plurality of display modules based on the calculated maximum power amount, and driving the plurality of display module so that each of the plurality of display module has a corresponding peak luminance level.

The total power capacity may be calculated by a sum of rated power capacities that are provided by the plurality of driving modules, respectively.

In the calculating of the maximum power amount, the maximum power amount usable in each of the plurality of display modules may be calculated based on the total power capacity that is provided by the plurality of driving modules, and a ratio between a total consumed power amount of the plurality of display modules and the individual consumed power amount of each of the plurality of display modules.

The display device may further include a storage including current control information for each luminance of each sub-pixel calibrated based on luminance and color characteristics according to a current of each of the sub-pixels constituting the plurality of display modules, and in the driving of the plurality of display modules, the plurality of display modules may be driven so that each of the plurality of display modules has the corresponding peak luminance level based on the information stored in the storage.

The current control information stored in the storage may include the current gain value for each luminance of each sub-pixel calibrated based on luminance level information according to the current of each sub-pixel and color shift information according to the current of each sub-pixel.

The storage may further store luminance level information for each power provided to the display module, and in the calculating of the peak luminance level, the peak luminance level of each of the plurality of display modules may be calculated based on the maximum luminance level information for each power and the maximum power amount usable in each of the plurality of display modules.

In the driving of the plurality of display modules, the current gain value for each sub-pixel corresponding to each of the plurality of display modules so that each of the plurality of display modules has the calculated peak luminance level may be obtained from the storage, and the plurality of display modules may be driven based on the obtained current gain value for each sub-pixel.

The storage may further store power information of each of the sub-pixels for each grayscale of an image, and in the calculating of the peak luminance level, a consumed power amount of each of the plurality of display modules may be calculated based on a grayscale of the image displayed on each of the plurality of display modules, and the power information of each of the sub-pixels for each grayscale.

Each of the plurality of display modules may be implemented as a light emitting diode (LED) cabinet including a plurality of LED elements, and each sub-pixel may be a Red (R) LED, Green (G) LED, and Blue (B) LED pixel.

Advantageous Effects

As described above, according to the diverse exemplary embodiments of the present disclosure, in the display device constituted by the plurality of display modules, a peaking effect may be maximized through the power sharing among the plurality of display modules at the time of implementing the peak luminance. In addition, since a color shift phenomenon due to an increase in current input to each sub-pixel may be prevented, a quality of an image provided to the user may be improved.

BEST MODE

Hereinafter, diverse exemplary embodiments of the present disclosure will be described in detail with reference to the accompanying drawings.

Figure 1:
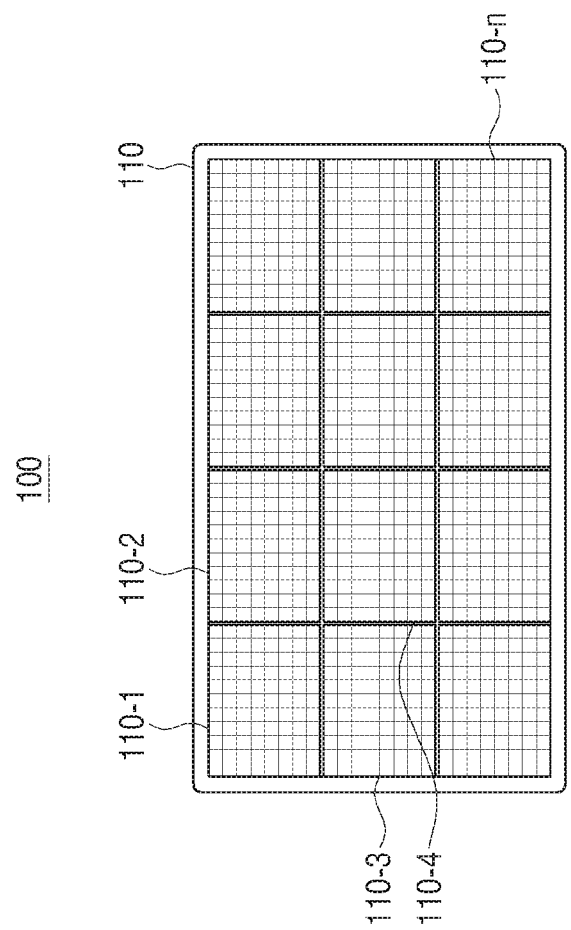
FIG. 1 is a diagram for schematically describing a configuration of a display device according to an exemplary embodiment of the present disclosure.

FIG. 1 is a diagram for schematically describing a configuration of a display device according to an exemplary embodiment of the present disclosure.

As illustrated in FIG. 1, a display device 100 according to an exemplary embodiment of the present disclosure may be implemented in the form in which a plurality of display modules 110-1, 110-2, 110-3, 110-4 . . . are physically connected to each other. Here, each of the plurality of display modules may include a plurality of pixels arranged in a matrix form, for example, a self light emitting pixels. In particular, display module may be implemented as an LED module in which each of the plurality of pixels is implemented as an LED pixel, or an LED cabinet to which a plurality of LED modules are connected. For example, the display module may also be implemented as a liquid crystal display (LCD), an organic LED (OLED), an active-matrix OLED (AMOLED), a plasma display panel (PDP), or the like, but is not limited thereto. However, for convenience of explanation, it is hereinafter assumed that each of the display modules is implemented as the LED cabinet.

The LED may display an image with high luminance as an applied current increases, and in general, when the display constituted by the plurality of LED display modules (for example, LED cabinets) is used, peak luminance of each display module is determined based on rated power capacity available in each display module.

In this case, since an amount of power required to implement the peak luminance differs according to the image displayed on each display module, the present disclosure describes diverse exemplary embodiments capable of maximizing a peaking effect through power sharing between the plurality of display modules at the time of implementing the peak luminance.

Figure 2A:
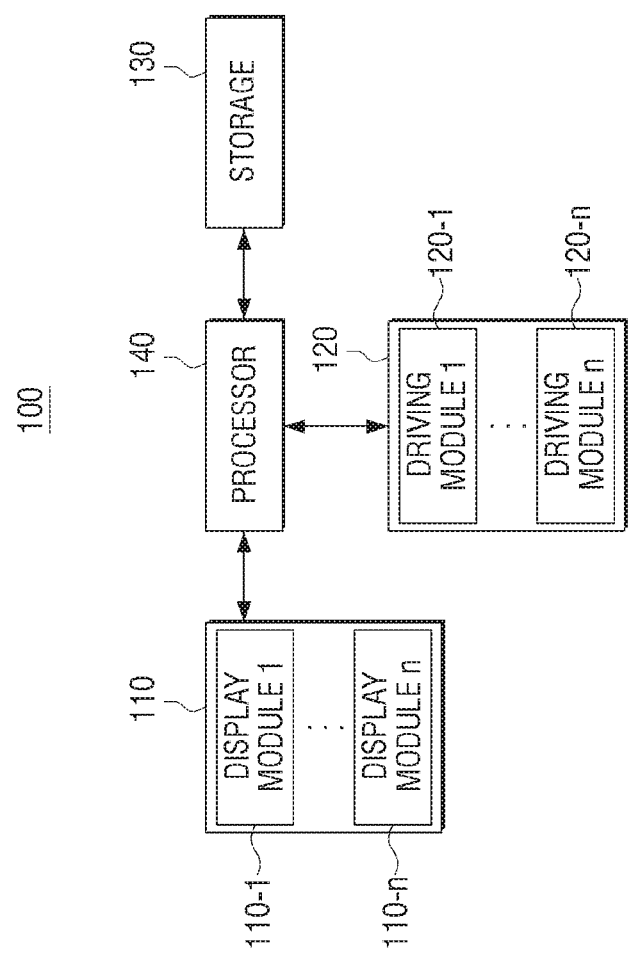
FIGS. 2A and 2B are block diagrams illustrating the configuration of the display device according to an exemplary embodiment of the present disclosure.

FIG. 2A is a block diagram illustrating the configuration of the display device according to an exemplary embodiment of the present disclosure.

Referring to FIG. 2A, the display device 100 includes a display 110, display driver 120, a storage 130, and a processor 140.

The display 110 includes a plurality of display modules. In particular, the display 110 may be configured in the form in which a plurality of display modules 110-1 to 110-$n$ are connected to each other and are assembled. Here, each of the plurality of display modules may include a plurality of pixels arranged in a matrix form, for example, a self light emitting pixels. According to an exemplary embodiment, the display 110 may be implemented by a plurality of LED modules (LED modules including at least one LED element) and/or a plurality of LED cabinets. In addition, the LED module may include a plurality of LED pixels, and according to an example, the LED pixel may be implemented as a RGB LED, and the RGB LED may include a RED LED, a GREEN LED, and a BLUE LED.

The display driver 120 drives the display 110 according to a control of the processor 140. For example, the display driver 120 drives each LED pixel by applying a driving voltage to each self light emitting element or allowing a driving current to flow therethrough to drive each self light emitting element constituting the display 110, for example, the LED pixel.

The display driver 120 includes a plurality of LED driving modules 120-1 to 120-$n$ connected to the plurality of display modules 110-1 to 110-$n$, respectively. The plurality of LED driving modules 120-1 to 120-$n$ drives the plurality of display modules 110-1 to 110-$n$ by supplying the driving current to the plurality of display modules 110-1 to 110-$n$ to correspond to the respective control signals input from the processor 140 to be described below.

Specifically, the plurality of LED driving modules 120-1 to 120-$n$ adjust and output a supply time or strength of the driving current supplied to the plurality of display modules 110-1 to 110-$n$ to correspond to the respective control signals input from the processor 140.

Each of the plurality of LED driving modules 120-1 to 120-$n$ may include a power supply for supplying power. The power supply is hardware that converts an alternating current (AC) into a direct current (DC) so as to be stably used in each of the plurality of display modules 110-1 to 110-$n$, and supplies power suitable for each system. The power supply may generally include an input electromagnetic interference (EMI) filter, an AC-DC rectifier, a DC-DC switching converter, an output filter, and an output module. The power supply may be implemented as, for example, a switched mode power supply (SMPS). The SMPS, which is a DC stabilized power supply device that stabilizes the output by controlling an on-off time ratio of a semiconductor switch element, may achieve high efficiency, miniaturization, and light weight, and may be used to drive each of the plurality of display modules 110-1 to 110-$n$.

However, according to another exemplary embodiment, the display driver 120 may be implemented as the form of one driving module that separately drives a plurality of SMPSs supplying the power to each of the plurality of display modules 110-1 to 110-$n$.

In some cases, each of the plurality of display modules may also be implemented to include a sub processor for controlling an operation of each display module, and a driving module driving each display module according to a control of the sub processor. In this case, each sub processor and driving module may be implemented by hardware, software, firmware, or an integrated chip (IC). According to an exemplary embodiment, each sub processor may be implemented by semiconductor ICs separated from each other.

The storage 130 stores various data necessary for the operation of the display device 100.

The storage 130 may be implemented as a non-volatile memory, a volatile memory, a hard disk drive (HDD) or solid state drive (SSD), a memory card (e.g., micro SD card, USB memory, etc.) mounted in the display device 100, an external memory (e.g., a USB memory, etc.) connectable to an external input port, or the like.

In particular, the storage 130 may store current information of the plurality of display module 110-1 to 110-$n$. Here, the current information may store separate current control information according to luminance for each of the sub-pixels constituting the display module. Here, the separate current control information according to the luminance for each of the sub-pixels may be separate current control information according to luminance for each of the sub-pixels calibrated (modeled) based on luminance characteristics and color shift characteristics according to a current of each sub-pixel.

This is because the R/G/B LED exhibits different luminance variation and color shift phenomenon depending on the current. Specifically, the LED is a current-driven element whose brightness varies depending on the current, and R/G/B LED has a unique resistance value for each color. Therefore, when the same current and voltage are applied, the power applied to each of the R/G/B LEDs varies, resulting in a luminance difference for each R/G/B LED. In addition, as the current applied to the R/G/B LED increases, the color shift phenomenon occurs in the R/G/B LED, and each of the R/G/B LEDs has different color shift values. Therefore, when a current value is increased all at once in order to implement high luminance in the display made of the LEDs, image quality degradation due to luminance deviation and color shift phenomenon may occur. Therefore, according to an exemplary embodiment of the present disclosure, the current control information for each of the R/G/B LEDs calibrated to compensate for the luminance deviation and color shift for each of the R/G/B LEDs may be stored.

Specifically, the current control information for each luminance of each sub-pixel may be information including a current gain value for each luminance of each sub-pixel calibrated based on luminance level information according to the current of each sub-pixel and color shift information according to the current of each sub-pixel. For example, the luminance level information according to the current for each sub-pixel may be luminance variation information according to current variation for each of the R/G/B ED elements, and the color information according to the current for each sub-pixel may be the degree of color coordinate (e.g., x, y color coordinate) variation according to the current variation for each of the R/G/B LED elements.

In this case, the current gain information for each luminance of each sub-pixel may be a current gain value for each luminance of each sub-pixel obtained by calibrating the current value so that the color shift phenomenon for each of the R/G/B LED elements according to the current variation does not occur while calibrating the current value so that a luminance variation amount for each of the R/G/B LED elements according to the current variation is similar to each other.

In addition, the storage 130 may store the luminance level information for each power provided to the display module. That is, as the power supplied to the display module increases, the luminance of the display module also increases, but when the supplied power exceeds a predetermined critical value, a luminance increase rate of the display module gradually decreases and does not increase more than the maximum luminance value. Therefore, information on a luminance variation amount of the display module according to the supply power variation amount may be measured in advance and stored in the storage 130.

In this case, the luminance level information for each power may be luminance increase amount information according to a power increase amount. However, the information is not limited to the information having the form described above, but any information may be applied as long as it is information indicating a relationship between the supply power and the luminance.

In addition, the storage 130 may store power information of each of the sub-pixels for each grayscale. Since a grayscale of the image is related to the luminance value, the power of each of the R/G/B LED elements necessary for expressing an image of a predetermined grayscale is changed. As described above, the power information of each of the R/G/B LED elements for each grayscale of the image may be stored in the storage 130.

For example, for 256 grayscale values (in case that the image has grayscales of 256 steps for each color signal) or 1024 grayscales (in case that the image has grayscales of 1024 steps for each color signal), the power information of each of the R/G/B LED elements for each grayscale may be stored in the storage 130. Such power information for each grayscale may be measured in advance and stored in the storage 130. That is, the power information for each grayscale may be obtained by measuring a power amount consumed in the R/G/B LED element in a state in which the image for each grayscale is each displayed on the display module.

In addition, the storage 130 may store information on Binning group, information on the maximum luminance for each of the pixels, information on color for each of the pixels, a luminance correction coefficient for each of the pixels, and the like. Here, the Binning group may be an LED pixel group having the same characteristics (luminance, color coordinate, etc.) as possible in case of the LED pixel.

For example, in order to match the maximum luminance to target luminance for uniformity among the plurality of LED pixels, the luminance is adjusted down through calibration using the luminance correction coefficient. In this case, the luminance correction coefficient may have the form of a 3*3 matrix for implementing the target R/G/B luminance, and it is possible to implement uniformity by applying different luminance correction coefficients to each pixel so that the maximum luminance becomes the target luminance. In addition, the color temperature may also be calibrated to have uniformity, while implementing the target luminance based on a parameter of the form of a 3*3 matrix corresponding to each of the R/G/B elements.

In addition, the storage 130 may further store information on the number of pixels, the size of pixels, and the spacing between the pixels that constitute each of the plurality of display modules.

Meanwhile, according to another exemplary embodiment, it is also possible that the above-described information stored in the storage 130 is not stored in the storage 130 but is obtained from an external device. For example, some information may be received in real time from an external device such as a set-top box, an external server, a user terminal, or the like.

The processor 140 controls an overall operation of the display device 100. Here, the processor 140 may include one or more of a central processing unit (CPU), a controller, an application processor (AP), a communication processor (CP), or an ARM processor.

In addition, the processor 140 may include a graphic processing unit (not illustrated) for processing a graphic corresponding to an image. The processor 140 may be implemented by a system on chip (SoC) including a core (not illustrated) and a graphic processing unit (GPU) (not illustrated). The processor 140 may include a single core, a dual core, a triple core, a quad core, or a multiple-number core thereof.

According to an exemplary embodiment of the present disclosure, the processor 140 may calculate the maximum power amount available in each of the plurality of the display modules 110-1 to 110-n based on the total power capacity that may be provided by the plurality of driving modules 120-1 to 120-n and an individual consumed power amount of each of the plurality of display modules 110-1 to 110-n. Thereafter, the processor 140 may calculate a peak luminance level of each of the plurality of display modules 110-1 to 110-n based on the calculated maximum power amount, and may control the plurality of driving modules 120-1 to 120-n so that each of the plurality of display modules 110-1 to 110-n has a corresponding peak luminance level based on the current control information stored in the storage 130.

In this case, the processor 140 may calculate the total power capacity that may be provided by the plurality of driving modules 120-1 to 120-n by the sum of rated power capacities that may be provided by each of the plurality of driving modules 120-1 to 120-n. Here, the capacity that may be provided by the plurality of driving modules 120-1 to 120-n may be rated capacity (or rated output) of the plurality of power supplies, that is, SMPSs, included in each of the plurality of driving modules 120-1 to 120-n.

Figure 2B:
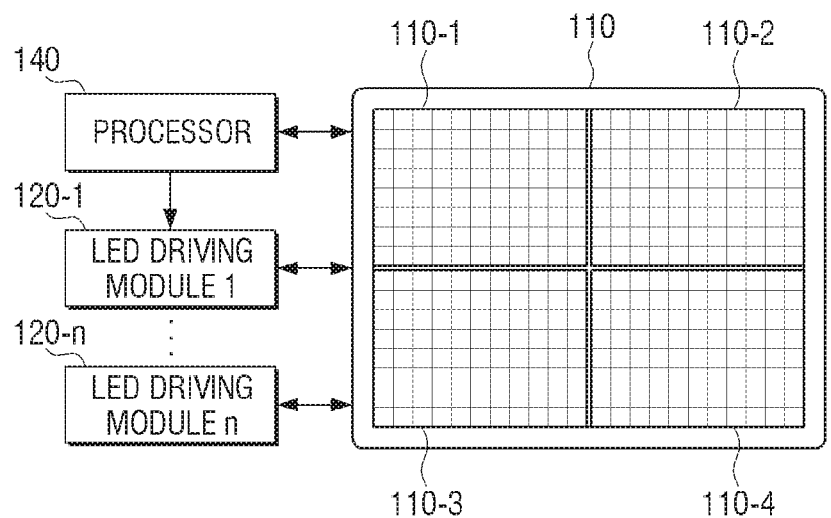

For example, as illustrated in FIG. 2B, it is assumed that the plurality of display modules 110-1 to 110-n are implemented as first to fourth display modules 110-1 to 110-4 and are driven by first to fourth driving modules 120-1 to 120-4, respectively. When the rated power capacity that may be provided by each of the first to fourth driving modules 120-1 to 120-4 is 200 W, the total power capacity may be calculated as 200 W*4=800 W.

In addition, the processor 140 may calculate a power amount consumed in each of the plurality of display modules 110-1 to 110-n based on the grayscale value of the image displayed on each of the plurality of display modules 110-1 to 110-n, and the power information of each of the sub-pixels for each grayscale obtained from the storage 130.

Figure 3A:
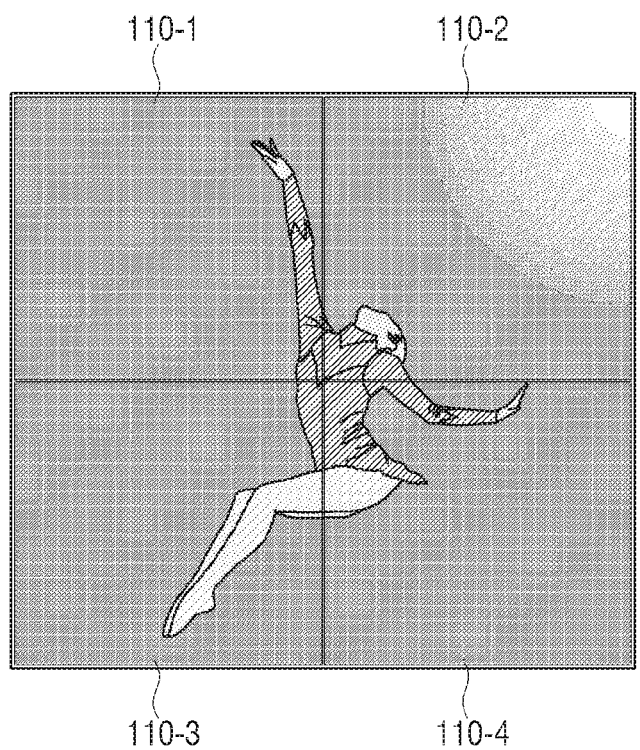
FIGS. 3A and 3B are diagrams for describing a method for calculating a consumed power amount of each display module according to an exemplary embodiment of the present disclosure.

For example, as illustrated in FIG. 3A, one input image frame is divided and displayed on the first to fourth display modules 110-1 to 110-4. In this case, image grayscales corresponding to each of first to fourth image regions provided to the first to fourth display modules 110-1 to 110-n are generally different from each other. The reason is that when one image frame is divided into a plurality of image regions, the images included in each divided image region are different from each other.

The processor 140 may calculate the power amount consumed in the first to fourth display modules 110-1 to 110-4 based on an image grayscale value to be expressed by the respective sub-pixels, that is, R/G/B, respectively, so that the first to fourth display modules 110-1 to 110-4 display the first to fourth image regions. In this case, the processor 140 may calculate the power amount consumed in the first to fourth display modules 110-1 to 110-4 based on the power information of each of the R/G/B LED elements for each grayscale stored in the storage 130.

Figure 4:
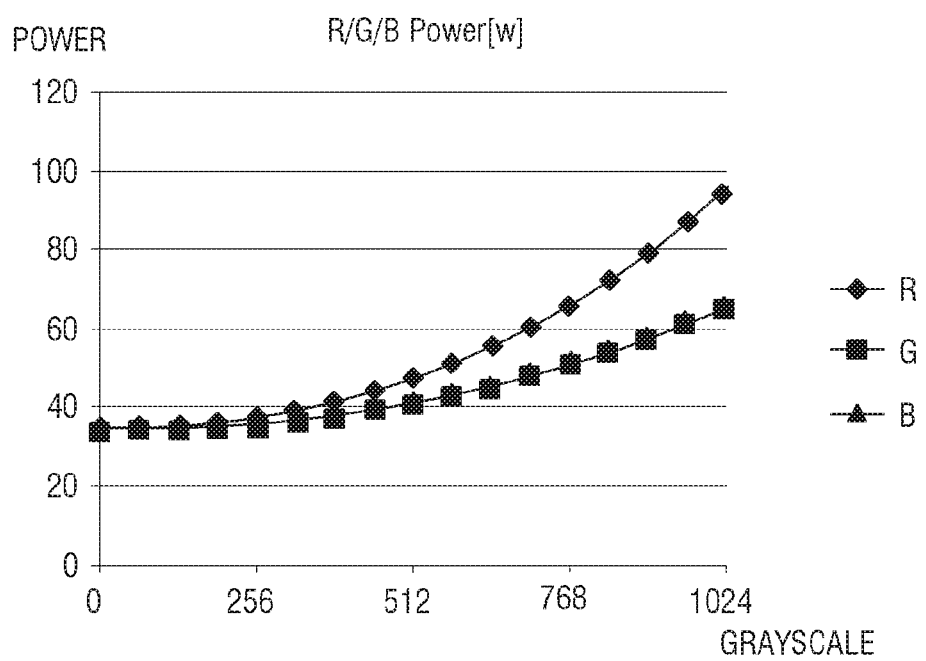
FIG. 4 is a diagram illustrating power information of each of the sub-pixels for each grayscale of an image according to an exemplary embodiment of the present disclosure.

FIG. 4 is a diagram illustrating power information of each of the sub-pixels for each grayscale of an image according to an exemplary embodiment of the present disclosure.

For example, as illustrated in FIG. 4, when each of the R/G/B LED elements expresses a grayscale value of 1024 grayscales, respectively, the consumed power amount may be different. In general, a Red LED element requires relatively large power to express the same grayscale value as compared to a Green LED element and a Blue LED element, and the green LED element and the Blue LED element require substantially the same power to express the same grayscale value.

Such a power value required for the grayscale expression of the image for each of the R/G/B LED elements is stored in advance in the storage 130, and the processor 140 may calculate an individual consumed power amount of each of the first to fourth display modules 110-1 to 110-4 based on the pre-stored information.

Figure 3B:
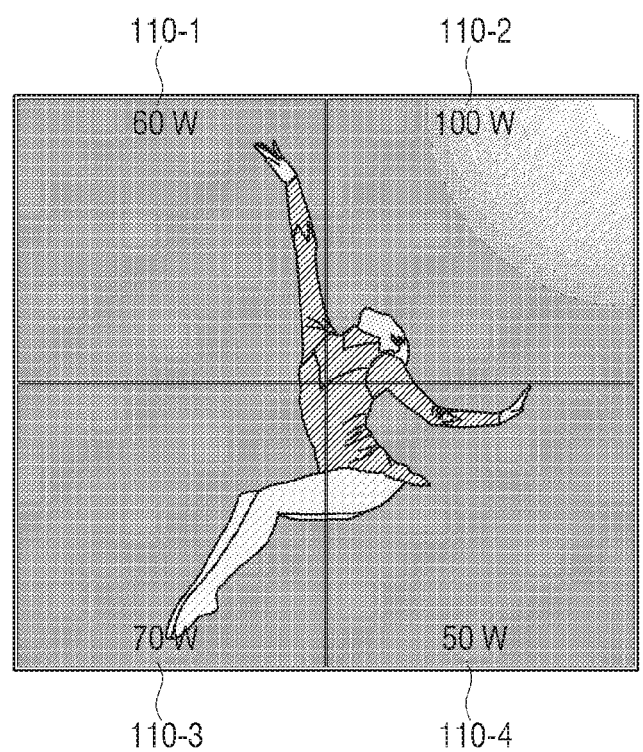

For example, as illustrated in FIG. 3B, the individual consumed power amounts of the first to fourth display modules 110-1 to 110-4 may be calculated as 60 W, 100 W, 70 W, and 50 W, respectively.

Next, the processor 140 may calculate the maximum power amount usable in each of the first to fourth display modules 110-1 to 110-4 based on the total power capacity 800 W that may be provided by the first to fourth display modules 110-1 to 110-4, and the individual consumed power amount 60 W, 100 W, 70 W, and 50 W of each of the first to fourth display modules 110-1 to 110-4.

According to an exemplary embodiment, the processor 140 may calculate the maximum power amount usable in each of the plurality of display modules 110-1 to 110-$n$ based on a ratio between the total consumed power amount of the plurality of display modules 110-1 to 110-$n$ and the individual consumed power amount of each of the plurality of display modules 110-1 to 110-$n$.

As an example, the processor 140 may calculate the maximum power amount usable in each of the plurality of display modules 110-1 to 110-$n$ by multiplying the total power capacity of the plurality of display modules 110-1 to 110-$n$ by a ratio between the total consumed power amount of the plurality of display modules 110-1 to 110-$n$ and the individual consumed power amount of each of the plurality of display modules 110-1 to 110-$n$.

For example, in the exemplary embodiment described above, the maximum power amount of each of the first to fourth display modules 110-1 to 110-4 may be calculated as 800*(60 W/280 W), 800*(100 W/280 W), 800*(70 W/280 W), and 800*(50 W/280 W).

According to another exemplary embodiment, the processor 140 may calculate the maximum power amount usable in each of the plurality of display modules 110-1 to 110-$n$ by multiplying a difference between the total power capacity of the plurality of display modules 110-1 to 110-$n$ and the total consumed power amount of the plurality of display modules 110-1 to 110-$n$, that is, an additionally usable power capacity by the ratio between the total consumed power amount of the plurality of display modules 110-1 to 110-$n$ and the consumed power amount of each of the plurality of display modules 110-1 to 110-$n$.

For example, since the additional usable power amount in the exemplary embodiment described above is 800 W−280 W=520 W, the maximum power amount of each of the first to fourth display modules 110-1 to 110-4 may be calculated as 60 W+520*(60 W/280 W), 100 W+520*(100 W/280 W), 70 W+520*(70 W/280 W), and 50 W+520*(50 W/280 W).

According to still another exemplary embodiment, the processor 140 may calculate the maximum power amount usable in each of the plurality of display modules 110-1 to 110-$n$ by multiplying the ratio between the total consumed power amount and the total power capacity of the plurality of display modules 110-1 to 110-$n$ by the consumed power amount of each of the display modules 110-1 to 110-$n$.

For example, in the exemplary embodiment described above, the maximum power amount of each of the first to fourth display modules 110-1 to 110-4 may be calculated as 60*(800/280), 100*(800 W/280 W), 70*(800 W/280 W), and 50*(800 W/280 W).

However, the method for calculating the maximum power amount usable in each of the plurality of display modules 110-1 to 110-$n$ is not limited to the exemplary embodiments described above, but various methods may be applied.

Next, the processor 140 may determine a peak luminance level corresponding to the maximum power amount of each of the plurality of display modules 110-1 to 110-$n$ based on the maximum luminance level information for each power provided to the display module which is stored in the storage 130.

Figure 5:
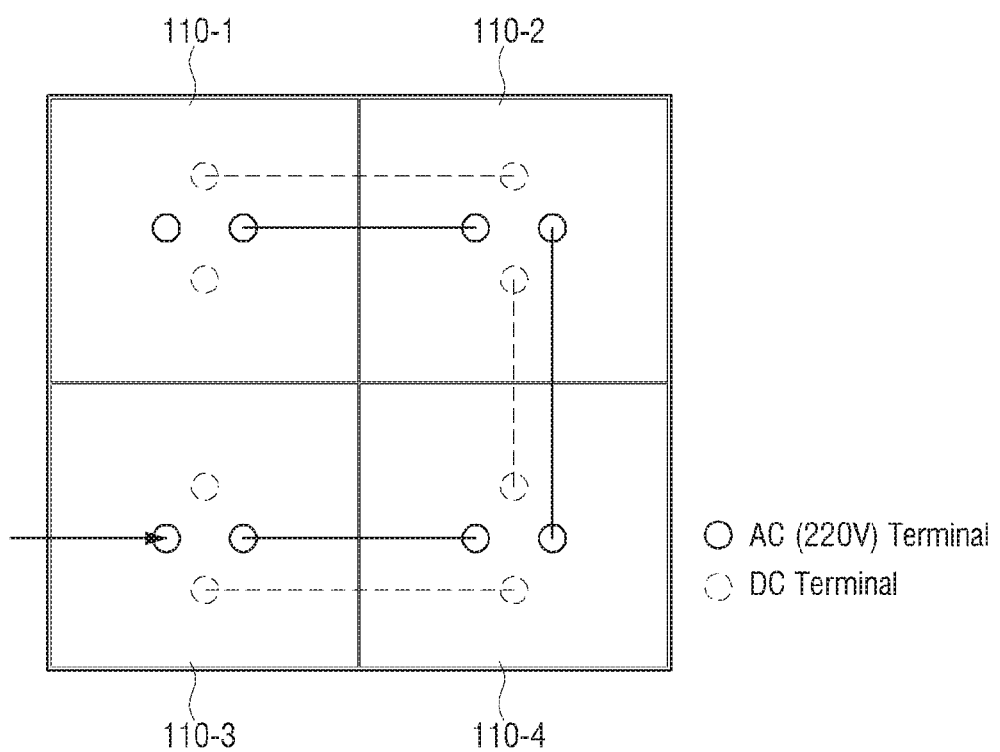
FIG. 5 is a diagram for describing a power sharing method among a plurality of display modules according to an exemplary embodiment of the present disclosure.

FIG. 5 is a diagram for describing a power sharing method among a plurality of display modules according to an exemplary embodiment of the present disclosure.

Referring to FIG. 5, the respective display modules 110-1 to 110-4 may share the power through connection between DC terminals (or AC terminals). However, the connection between the DC terminals (or AC terminals) is not limited to the configuration illustrated in FIG. 5, but may be implemented in various configurations in which the power may be shared between the respective display modules 110-1 to 110-4.

Figure 6:
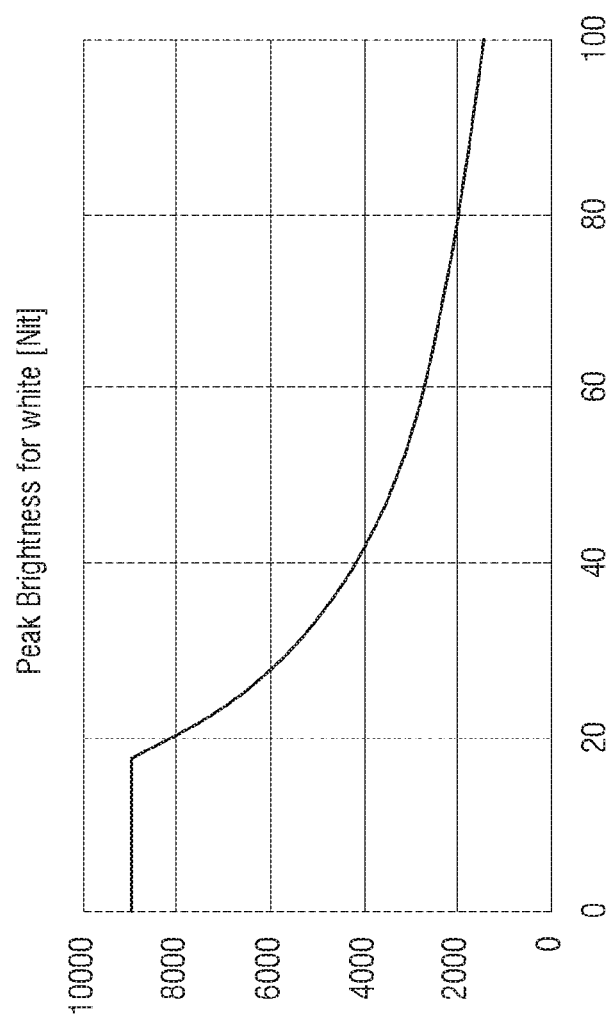
FIG. 6 is a diagram illustrating maximum luminance level information for each power provided to the display modules according to an exemplary embodiment of the present disclosure.

FIG. 6 is a diagram illustrating maximum luminance level information for each power provided to the display modules according to an exemplary embodiment of the present disclosure.

For example, the luminance level information for each power may be a diagram illustrating a luminance increase amount according to a power increase amount as illustrated in FIG. 6. As illustrated, as the power increase amount increases, a luminance amount increased for the same power amount is gradually decreased. However, the information that may be used according to an exemplary embodiment of the present disclosure is applicable as long as the information indicates the relationship between the supplied power and the luminance, but is not limited thereto.

The processor 140 may determine the peak luminance level of each of the plurality of display modules 110-1 to 110-$n$ based on the above-mentioned information.

Meanwhile, the processor 140 may obtain a current gain value of each sub-pixel corresponding to each of the plurality of display modules 110-1 to 110-$n$ so that each of the plurality of display modules 110-1 to 110-$n$ has the calculated target peak luminance level from the storage 130, and may control a driving state of each of the plurality of driving modules 120-1 to 120-$n$ based on the obtained current gain value of each sub-pixel.

That is, the storage 130 may store current gain information for each luminance of each of the sub-pixels constituting the plurality of display modules 110-1 to 110-$n$.

Figure 7:
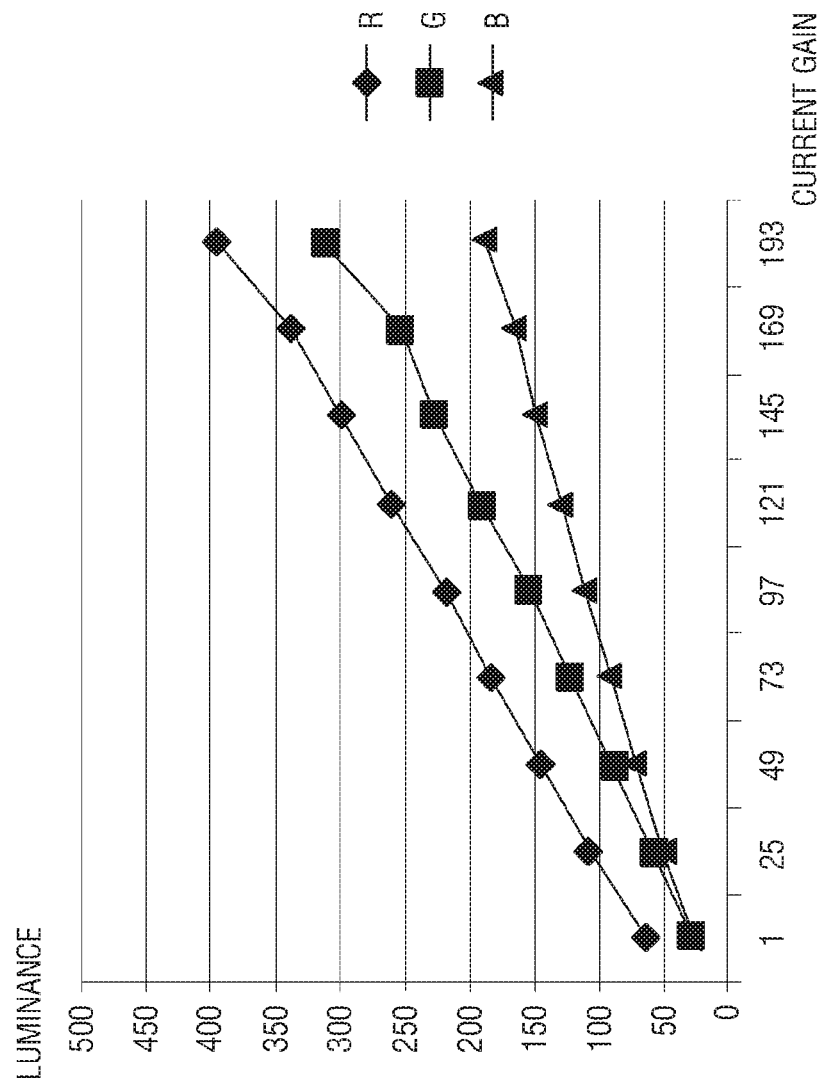
FIG. 7 is a diagram illustrating current gain information for each luminance of each sub-pixel according to an exemplary embodiment of the present disclosure.

FIG. 7 is a diagram illustrating current gain information for each luminance of each sub-pixel according to an exemplary embodiment of the present disclosure.

The current gain information for each luminance of each sub-pixel as illustrated in FIG. 7 may include the current gain value for each luminance of each sub-pixel calibrated based on luminance and color characteristics of each sub-pixel according to the current increase.

Figure 8:
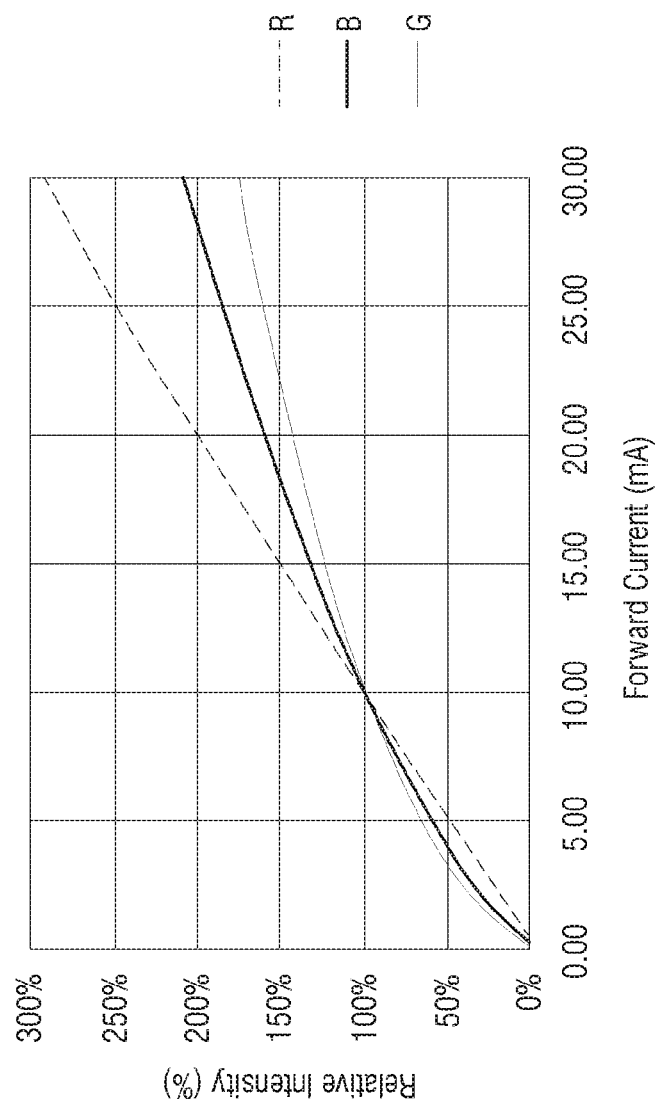
FIG. 8 is a diagram for describing luminance characteristics of a red/green/blue (R/G/B) LED element according to an increase in current for assisting understanding of the present disclosure.
Figure 9A:
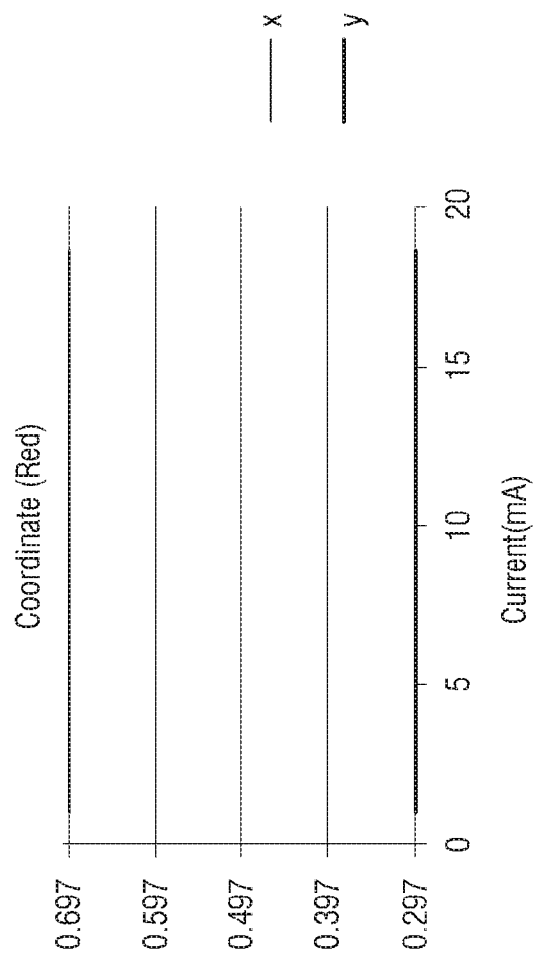
FIGS. 9A to 9C are diagrams for describing color shift characteristics of the red/green/blue (R/G/B) LED element according to an increase in current for assisting understanding of the present disclosure.
Figure 9B:
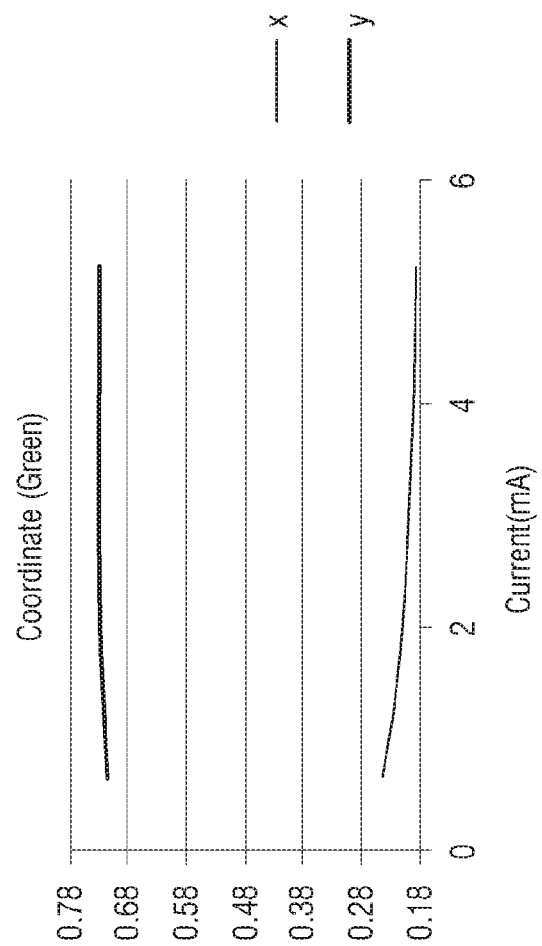
Figure 9C:
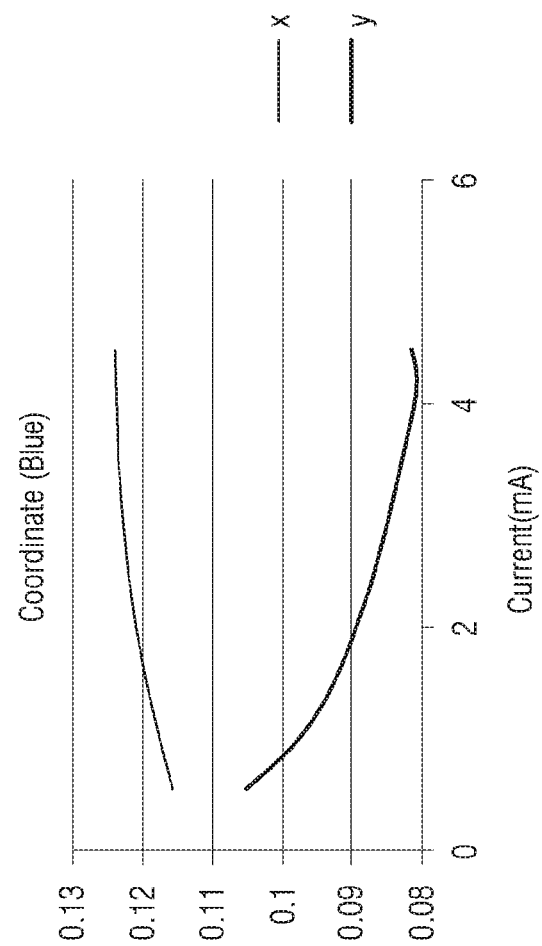

Specifically, as illustrated in FIG. 8, the R/G/B LED element has different luminance increase characteristics according to the current increase. In addition, as illustrated in FIGS. 9A to 9C, the R/G/B LED element has a color coordinate that varies in a different form according to the current increase, resulting in having different color shift characteristics. For example, it may be confirmed that as illustrated in FIG. 9A, a Red pixel maintains the x and y coordinates having the same value according to the current increase, but as illustrated in FIG. 9B, a Green pixel has the x and y coordinates that are slightly varied, and as illustrated in FIGS. 9B and 9C, a Blue pixel has the x and y coordinates that are significantly varied according to the current increase.

Therefore, the storage 130 may store the current gain value for each luminance of the R/G/B LED element calculated by reflecting luminance characteristics according to the current of the R/G/B LED element as illustrated in FIG. 7 and color characteristics according to the current of the R/G/B LED element as illustrated in FIGS. 8A to 8C. As an example, the current gain information may include the current gain values classified into $2^8$ steps based on 8-bit information, but is not limited thereto.

For example, the peak luminance levels corresponding to the maximum power amounts 180 W, 300 W, 210 W, and 150 W of the first to fourth display modules 110-1 to 110-4, respectively, are determined as A, B, C, and D, and the gain value of the current flowing through each of the R/G/B LED elements may be applied to a specific current value required to implement each luminance level based on the graph of FIG. 7. That is, final current values obtained by applying the current gain value according to the characteristics of the R/G/B LED element to the respective current values a, b, c, and d for implementing the peak luminance level of each of the first to fourth display modules 110-1 to 110-4 may be applied to the first to fourth display modules 110-1 to 110-4.

For example, the luminance of the first to fourth display modules 110-1 to 110-4 may be controlled to the peak luminance level by applying gain values $g_{r1}$, $g_{g1}$, and $g_{b1}$ for driving the R/G/B LED elements of the first display module 110-1 to a corresponding current value a, applying gain values $g_{r2}$, $g_{g2}$, and $g_{b2}$ for driving the R/G/B LED elements of the second display module 110-2 to a corresponding current value b, applying gain values $g_{r3}$, $g_{g3}$, and $g_{b3}$ for driving the R/G/B LED elements of the third display module 110-3 to a corresponding current value c, and applying gain values $g_{r4}$, $g_{g4}$, and $g_{b4}$ for driving the R/G/B LED elements of the fourth display module 110-4 to a corresponding current value d.

Figure 10:
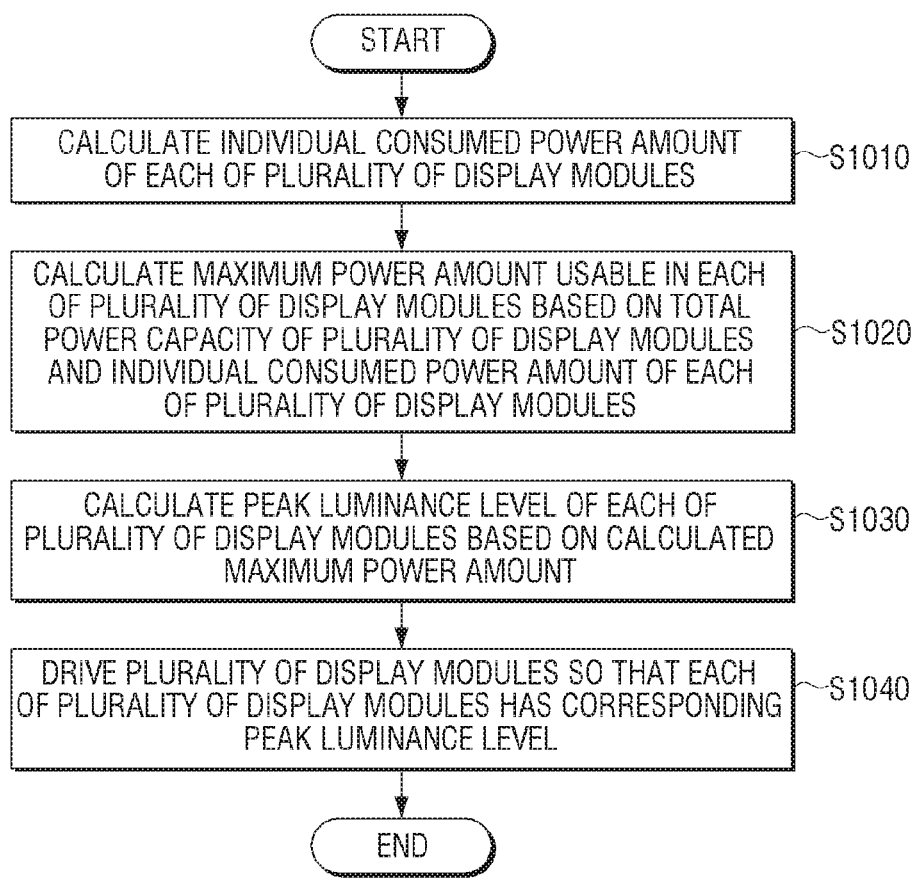
FIG. 10 is a flow chart for describing a driving method of a display device according to an exemplary embodiment of the present disclosure.

FIG. 10 is a flow chart for describing a driving method of a display device according to an exemplary embodiment of the present disclosure.

FIG. 10 illustrates a driving method of a display device including a display constituted by a plurality of display modules according to an exemplary embodiment of the present disclosure.

According to the driving method of the display device illustrated in FIG. 10, first, an individual consumed power amount of each of the plurality of display modules is calculated (S910).

Next, the maximum power amount usable in each of the plurality of display modules is calculated based on a total power capacity of the plurality of display modules and an individual consumed power amount of each of the plurality of display modules (S920). Here, the total power capacity may be calculated by the sum of rated power capacities of each of the plurality of display modules.

Next, a peak luminance level of each of the plurality of display modules is calculated based on the calculated maximum power amount (S930).

Thereafter, the plurality of display modules are driven so that each of the plurality of display modules has a corresponding peak luminance level (S940).

In step (S930) of calculating the maximum power amount usable in each of the plurality of display modules, the maximum power amount usable in each of the plurality of display modules may be calculated based on the total power capacity that may be provided by the plurality of driving modules, and a ratio between the total consumed power amount of the plurality of display modules and the individual consumed power amount of each of the plurality of display modules.

Meanwhile, the display device may include current control information for each luminance of each sub-pixel calibrated based on luminance and color characteristics according to a current of each of the sub-pixels constituting the plurality of display modules. Here, the current control information may be information including a current gain value for each luminance of each sub-pixel calibrated based on luminance level information according to the current of each sub-pixel and color shift information according to the current of each sub-pixel. In this case, in step (S930) of driving the plurality of display modules, the plurality of display modules may be driven so that each of the plurality of display modules has the corresponding peak luminance level based on the current control information stored in the storage.

In addition, the storage may further store luminance level information for each power provided to the display module. In this case, in step (920) of calculating the peak luminance level, a power increase amount of the remaining display modules may be determined based on a power increase amount of a reference display module having the maximum consumed power amount among the consumed power amounts of the plurality of display modules, respectively, and the peak luminance level of each display module may be calculated based on the maximum power amount calculated for each display module.

In addition, the storage may further store luminance level information for each power provided to the display module. In this case, in step (S930) of calculating the peak luminance level, the peak luminance level of each of the plurality of display modules may be calculated based on maximum luminance level information for each power, and the maximum power amount usable in each of the plurality of display modules.

In addition, in step (S940) of driving the plurality of display modules, a current gain value for each sub-pixel corresponding to each of the plurality of display modules so that each of the plurality of display modules has the calculated peak luminance level may be obtained from the storage, and the plurality of display modules may be driven based on the obtained current gain value for each sub-pixel.

In addition, the storage may further store power information of each of the sub-pixels for each grayscale of an image. In this case, in step (S910) of calculating the consumed power amount of each of the plurality of display modules, the consumed power amount of each of the plurality of display modules may be calculated based on a grayscale value of the image displayed on each of the plurality of display modules, and the power information of each of the sub-pixels for each grayscale.

Meanwhile, each of the plurality of display modules may be implemented as an LED cabinet including a plurality of LED elements, and each sub-pixel may be implemented as a Red (R) LED, a Green (G) LED, and a Blue (B) LED.

As described above, according to the diverse exemplary embodiments of the present disclosure, in the display device constituted by the plurality of display modules, a peaking effect may be maximized through the power sharing among the plurality of display modules at the time of implementing the peak luminance. In addition, since a color shift phenomenon due to an increase in current input to each sub-pixel may be prevented, a quality of an image provided to the user may be improved.

Meanwhile, the methods according to the diverse exemplary embodiments of the present disclosure may be implemented by only software/hardware upgrade for the display device constituted by existing unit display modules and/or unit display modules.

In addition, a non-transitory computer readable medium in which a program sequentially performing the driving method according to the present disclosure is stored may be provided.

The non-transitory computer readable medium is not a medium that stores data for a short time such as a register, a cache, a memory, or the like, but means a medium that semi-permanently stores data and is readable by a machine. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should not be understood individually from the technical idea or viewpoint of the present disclosure.

The invention claimed is:

1. A display device comprising:
a display configured to include a plurality of display modules;
a display driver configured to include a plurality of driving modules connected to the plurality of display modules, respectively;
a storage configured to store current control information for each luminance of a display element; and
a processor configured to calculate a maximum power amount usable in each of the plurality of display modules based on a total power capacity that is provided by the plurality of driving modules and a ratio of a total consumed power amount of the plurality of display modules according to an image being displayed through the plurality of display modules to an individual consumed power amount of each of the plurality of display modules according to the image being displayed by the plurality of display modules, to calculate a peak luminance level of each of the plurality of display modules based on the calculated maximum power amount, and to control the plurality of driving modules so that each of the plurality of display modules has a corresponding peak luminance level based on the current control information.

2. The display device as claimed in claim 1, wherein the total power capacity is calculated by a sum of rated power capacities that are provided by the plurality of driving modules, respectively.

3. The display device as claimed in claim 1, wherein the current control information includes current control information for each luminance of each sub-pixel calibrated based on luminance and color characteristics according to a current of each sub-pixel constituting the plurality of display modules, and the processor controls the plurality of driving modules so that each of the plurality of display modules has the corresponding peak luminance level based on the current control information stored in the storage.

4. The display device as claimed in claim 3, wherein the current control information stored in the storage is information including a current gain value for each luminance of each sub-pixel calibrated based on luminance level information according to the current of each sub-pixel and color shift information according to the current of each sub-pixel.

5. The display device as claimed in claim 1, wherein the storage further stores luminance level information for each power provided to each of the plurality of display modules, and the processor calculates the peak luminance level of each of the plurality of display modules based on a maximum luminance level information for each power and the maximum power amount usable in each of the plurality of display modules.

6. The display device as claimed in claim 5, wherein the processor obtains a current gain value for each sub-pixel corresponding to each of the plurality of display modules so that each of the plurality of display modules has the calculated peak luminance level from the storage, and controls a driving state of each of the plurality of driving modules based on the obtained current gain value for each sub-pixel.

7. The display device as claimed in claim 1, wherein the storage further stores power information of each sub-pixel for each grayscale of the image, and the processor calculates a consumed power amount of each of the plurality of display modules based on a grayscale of the image displayed on each of the plurality of display modules, and the power information of each sub-pixel for each grayscale.

8. The display device as claimed in claim 1, wherein each of the plurality of display modules is implemented as a light emitting diode (LED) cabinet including a plurality of LED elements, and each sub-pixel is a Red (R) LED, Green (G) LED, and Blue (B) LED pixel.

9. A driving method of a display device including a display constituted by a plurality of display modules, the driving method comprising:
calculating a maximum power amount usable in each of the plurality of display modules based on a total power capacity that is provided by a plurality of driving modules driving the plurality of display modules, and a ratio of a total consumed power amount of the plurality of display modules according to an image being displayed through the plurality of display modules to an individual consumed power amount of each of the plurality of display modules according to the image being displayed by the plurality of display modules; and calculating a peak luminance level of each of the plurality of display modules based on the calculated maximum power amount, and driving the plurality of display modules so that each of the plurality of display modules has a corresponding peak luminance level.

10. The driving method as claimed in claim 9, wherein the total power capacity is calculated by a sum of rated power capacities that are provided by the plurality of driving modules, respectively.

11. The driving method as claimed in claim 9, wherein the display device further includes a storage including current control information for each luminance of each sub-pixel calibrated based on luminance and color characteristics according to a current of each sub-pixel constituting the plurality of display modules, and in the driving of the plurality of display modules, the plurality of display modules is driven so that each of the plurality of display modules has the corresponding peak luminance level based on the current control information stored in the storage.

12. The driving method as claimed in claim 11, wherein the current control information stored in the storage is information including a current gain value for each luminance of each sub-pixel calibrated based on luminance level information according to the current of each sub-pixel and color shift information according to the current of each sub-pixel.

13. The driving method as claimed in claim 9, wherein the storage further stores luminance level information for each power provided to each of the plurality of display modules, and in the calculating of the peak luminance level, the peak luminance level of each of the plurality of display modules is calculated based on a maximum luminance level information for each power and the maximum power amount usable in each of the plurality of display modules.

\* \* \* \* \*